US009796483B2

(12) United States Patent
Chang et al.

(10) Patent No.: US 9,796,483 B2
(45) Date of Patent: *Oct. 24, 2017

(54) TRANSPORT AND ASSEMBLY SYSTEM AND METHOD FOR COMPOSITE BARREL SEGMENTS

(71) Applicant: The Boeing Company, Huntington Beach, CA (US)

(72) Inventors: Li C Chang, Mount Pleasant, SC (US); Richard M Coleman, Renton, WA (US); Ronald J Steckman, North Charleston, SC (US); Andrew M Huckey, Mount Pleasant, SC (US); Nicholas A Norman, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 707 days.

This patent is subject to a terminal disclaimer.

(21) Appl. No.: 14/294,794

(22) Filed: Jun. 3, 2014

(65) Prior Publication Data

US 2014/0327184 A1 Nov. 6, 2014

Related U.S. Application Data

(63) Continuation of application No. 13/622,035, filed on Sep. 18, 2012, now Pat. No. 8,789,837.

(51) Int. Cl.
*B64C 1/06* (2006.01)
*B64F 5/00* (2017.01)
(Continued)

(52) U.S. Cl.
CPC ............... *B64F 5/0009* (2013.01); *B23Q 3/00* (2013.01); *B64C 1/068* (2013.01); *B64F 5/50* (2017.01);
(Continued)

(58) Field of Classification Search
CPC .................................... B64F 5/50; B64C 1/068
See application file for complete search history.

(56) References Cited

U.S. PATENT DOCUMENTS 2,391,510 A    12/1945 Pioch et al.
2,649,632 A    8/1953 Kessler
(Continued)

FOREIGN PATENT DOCUMENTS

EP    2284076    2/2011

OTHER PUBLICATIONS

International Searching Authority, International Preliminary Report on Patentability issued in PCT/US2013/051991 dated Mar. 24, 2015.

(Continued)

*Primary Examiner* — Alison L Hindenlang
*Assistant Examiner* — Jamel M Nelson
(74) *Attorney, Agent, or Firm* — Parsons Behle & Latimer

(57) ABSTRACT

A barrel assembly for a composite structure includes a barrel of composite material, a first end ring, and a mid support. The barrel of composite material has a first end, an interior surface and an outer surface, and the first end ring is removably attached to the first end. The first end ring has a perimeter that is substantially congruent with the first end, and is configured to maintain a shape of the barrel. The mid support is removably disposed within the barrel, and has a plurality of spokes extending outwardly from a central hub to contact the interior surface, to maintain a shape of the barrel.

19 Claims, 8 Drawing Sheets

(51) Int. Cl.
*B23Q 3/00* (2006.01)
*B64F 5/50* (2017.01)

(52) U.S. Cl.
CPC .... *Y10T 29/49826* (2015.01); *Y10T 29/53961* (2015.01)

(56) References Cited

U.S. PATENT DOCUMENTS

| | | | |
|---|---|---|---|
| 3,017,754 A | 1/1962 | Moe et al. | |
| 3,194,525 A | 7/1965 | Webb | |
| 4,440,265 A | 4/1984 | Spagnoli | |
| 4,461,455 A | 7/1984 | Mills et al. | |
| 5,088,682 A | 2/1992 | Gibbs | |
| 5,645,389 A | 7/1997 | Lilja et al. | |
| 5,722,512 A | 3/1998 | Lilja et al. | |
| 5,816,367 A | 10/1998 | Lilja et al. | |
| 6,000,903 A | 12/1999 | Hatch et al. | |
| 6,170,141 B1 | 1/2001 | Rossway et al. | |
| 6,231,038 B1 | 5/2001 | Keyser et al. | |
| 6,298,536 B1 | 10/2001 | Rossway et al. | |
| 6,334,746 B1 | 1/2002 | Nguyen et al. | |
| 7,596,843 B2* | 10/2009 | Spishak | B64F 5/10 269/28 |
| 7,624,488 B2 | 12/2009 | Lum et al. | |
| 7,770,292 B2 | 8/2010 | Stretton | |
| 8,342,495 B2 | 1/2013 | Weissenborn | |
| 8,789,837 B2* | 7/2014 | Chang | B23Q 3/00 206/319 |
| 2003/0025261 A1 | 2/2003 | Anton | |
| 2006/0118235 A1 | 6/2006 | Lum et al. | |
| 2010/0192346 A1 | 8/2010 | Simmons | |
| 2012/0305725 A1 | 12/2012 | Dackow | |
| 2013/0122133 A1 | 5/2013 | Holmes et al. | |

OTHER PUBLICATIONS

International Searching Authority, Invitation to Pay Additional Fees and Partial Search Report for PCT/US2013/0051991 dated Dec. 12, 2013.
US Patent and Trademark Office; NOA for U.S. Appl. No. 13/622,035 dated Mar. 18, 2014.
US Patent and Trademark Office; Office Action for U.S. Appl. No. 13/722,526 dated Jun. 1, 2017.
US Patent and Trademark Office; Office Action for U.S. Appl. No. 13/722,526 dated Apr. 30, 2016.

* cited by examiner

US 9,796,483 B2

TRANSPORT AND ASSEMBLY SYSTEM AND METHOD FOR COMPOSITE BARREL SEGMENTS

PRIORITY CLAIM

The present application is a continuation of U.S. patent application Ser. No. 13/622,035, filed on Sep. 18, 2012 and entitled TRANSPORT AND ASSEMBLY SYSTEM AND METHOD FOR COMPOSITE BARREL SEGMENTS, the disclosure of which is incorporated herein by reference in its entirety.

BACKGROUND

Field of the Invention

The present invention relates generally to the support and transport of composite barrel segments during manufacture and assembly. More particularly, the present invention relates to a system and method for supporting the shape of composite barrel segments, such as aircraft fuselage segments, from the point of mandrel removal through assembly with other barrel segments.

Background

In recent years, aircraft manufacturers have developed aircraft designs and aircraft fabrication methods that make greater use of carbon fiber composite materials and the like ("composite materials" or "CFCM"), such as graphite/epoxy and carbon fiber reinforced plastic ("CFRP"). Composite materials are significantly lighter than traditional aircraft materials (e.g. aluminum, titanium, steel and alloys of these), and can provide high strength with low weight, allowing lighter, more fuel efficient aircraft. In some newer aircraft, for example, the majority of the primary structure, including the fuselage and wing, is made of composite materials. By volume, some new aircraft can be about 80% composite materials.

Since composite materials have different characteristics than some traditional aircraft materials, new facilities, equipment and handling methods have been developed. For example, whereas traditional aircraft manufacturing involves attaching fuselage skin sections (e.g. aluminum sheets) to a metal aircraft frame, large barrel-shaped fuselage sections of composite material can be built as a single unit on an inner mold line mandrel. Such fuselage sections can be quite large, and are typically fabricated without an internal frame. After curing of the composite material, the inner mandrel is removed, and the fuselage section can be assembled with other fuselage sections.

Since structures fabricated from composite materials have different characteristics than many traditional aircraft materials, new equipment and methods have been developed for carrying and holding such structures after removal from a mandrel. One challenge presented by devices for holding and transporting large, frameless composite barrel sections after removal from a mandrel is controlling the shape of the barrel within geometric tolerances during subsequent manufacturing operations or during storage.

The present application seeks to address one or more of the above issues.

SUMMARY

It has been recognized that it would be advantageous to develop systems and methods for controlling the shape of a composite barrel section within geometric tolerances during movement and during storage.

It has also been recognized that it would be advantageous to have systems and methods for controlling the shape of a composite barrel section that can be quickly and easily installed or removed.

It has also been recognized that it would be advantageous to have systems and methods for accurately controlling the shape of a composite barrel section within a dimensional tolerance that support further fabrication and assembly steps.

In accordance with one embodiment thereof, the present invention provides a barrel assembly for a composite structure. The barrel assembly includes a barrel of composite material, a first end ring, and a mid support. The barrel has a first end, an interior surface and an outer surface, and the first end ring is removably attached to the first end. The first end ring has a perimeter that is congruent with the first end, and is configured to maintain a circumferential shape of the barrel. The mid support is removably disposed within the barrel, and has plurality of spokes extending outwardly from a central hub to contact the interior surface, to maintain a shape of the barrel.

In accordance with another aspect thereof, the invention provides a system for moving a composite aircraft fuselage section having a generally cylindrical shape, two opposite ends, an inner surface and an outer surface. The system includes a pair of end rings, at least two supports disposable within the fuselage section, and a moveable cart, configured to support the fuselage section. The end rings are removably attachable to the opposite ends of the fuselage section, and configured to maintain a shape of the fuselage section, each end ring having a perimeter that is congruent with the respective end. The at least two supports have a plurality of adjustable spokes that are extendable outwardly from a central hub to contact the inner surface, to maintain a shape of the fuselage section. The moveable cart has a plurality of supports configured to contact and support the outer surface to substantially retain a nominal shape of the fuselage section.

In accordance with yet another aspect thereof, the invention provides a method for transporting a composite barrel. The method includes attaching first and second end rings at first and second ends of a composite barrel, each end ring having a perimeter that is congruent with the respective end, installing at least two supports against an inner surface of the composite barrel, the supports comprising a hub and a plurality of adjustable spokes extending from the hub to the inner surface, and placing the composite barrel upon shape-confirming supports on a moveable platform.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
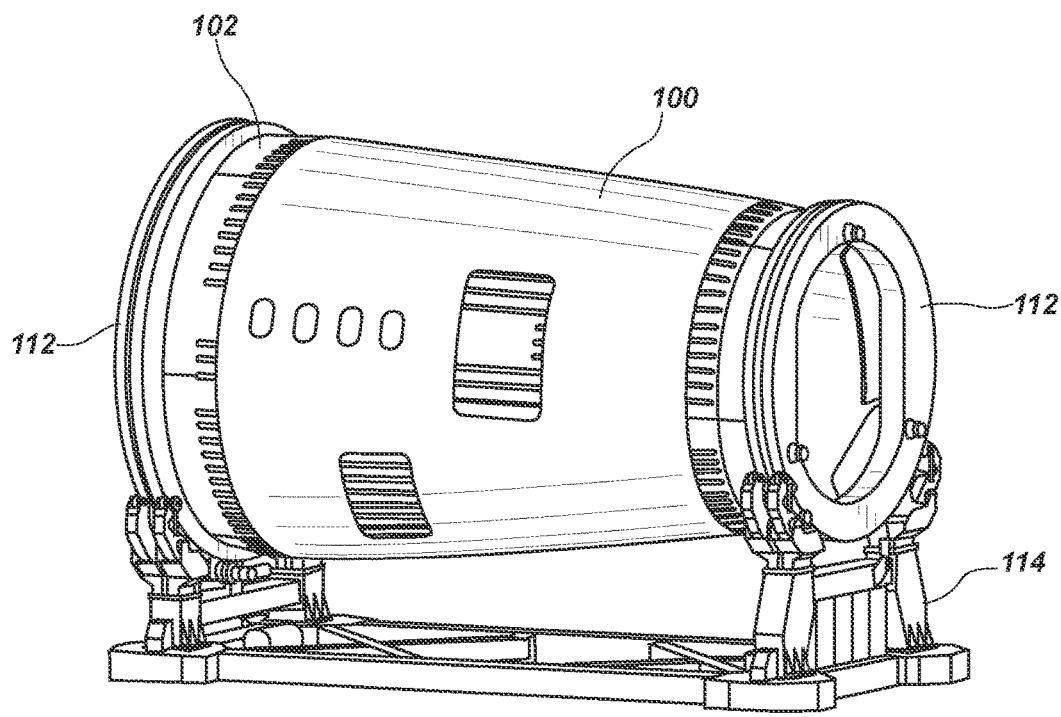
FIG. 1 is a perspective view of an aircraft barrel section supported by a mandrel mounted on a pair of mandrel support rings.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As noted above, large barrel-shaped fuselage sections of composite material can be fabricated on a mandrel having a size and shape that matches the desired inner mold line of the composite shape. After curing of the composite material, the inner mandrel is then removed in preparation for further manufacturing and assembly steps. Such fuselage sections can be quite large, and are frequently initially assembled without an internal frame structure.

A composite barrel section without an internal frame in post-cure condition may not be as stiff as desired for transport to subsequent manufacturing operations. Consequently, new equipment and methods have been developed in the aircraft industry for carrying and holding composite fuselage sections after removal from a mandrel. After removal from the mandrel, however, controlling the shape of the barrel within geometric tolerances during transport (e.g. from cell to cell during assembly) and/or during storage presents some challenges.

Some prior methods for holding and transporting large composite barrel sections may not maintain the geometric shape of the section as desired. For example, composite barrel sections can be attached (e.g. clamped) to end stabilizer rings that match the geometric shape of the ends of the barrel section but do not maintain geometrical dimensioning and tolerancing ("GD&T"). Such, stabilizer rings may be attached to an assembly cart for moving the barrel section from point to point in an assembly process. Unfortunately, the use of end stabilizer rings alone may not hold the barrel section shape within desired geometric tolerances. This can result in increased labor costs during installation of frame members and other appurtenances, for example, or involve reworking in order to join the barrel section to an adjacent barrel section. Advantageously, the system and method disclosed herein helps to address these issues and is believed to improve the quality of joints in adjacent barrel sections and to improve the quality of frame installation.

Figure 2:
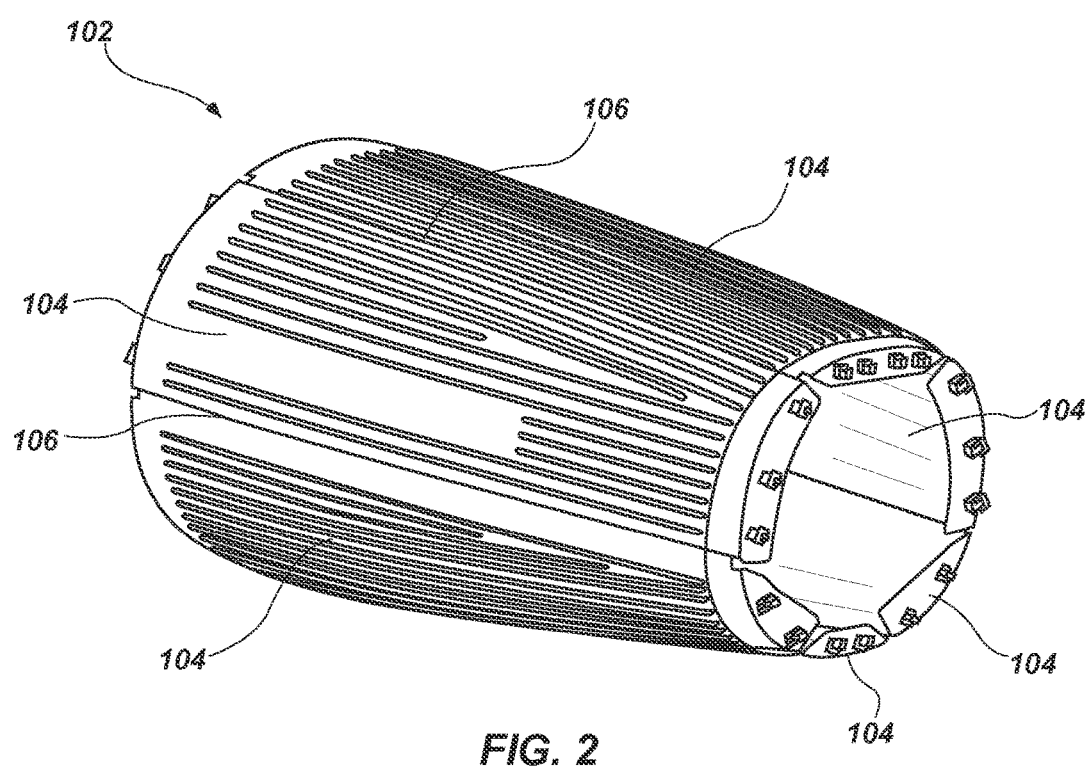
FIG. 2 is a perspective view of a six-section mandrel for forming an aircraft barrel section.

Many types of composite structures are fabricated using a mandrel, on which carbon fiber strands are wound and then impregnated with epoxy resin, or pre-impregnated carbon fiber fabric, tape, and/or tows are laid up, and then cured. Shown in FIG. 1 is a perspective view of an aircraft barrel section 100 supported by a six-piece removable inner mandrel 102. A perspective view of the six-section mandrel 102 is shown in FIG. 2. While this particular mandrel 102 has a tapered cylindrical shape, and is designed for fabrication of a tapered rearward segment of an aircraft fuselage, this is only one exemplary configuration. It will be apparent that other mandrel shapes and configurations can be provided for fabricating barrel sections of a variety of shapes and for a variety of applications. The barrel sections shown and described herein have a generally cylindrical shape. As used herein, the term "generally cylindrical" is intended to include a wide variety of cylindrical or cylinder-like shapes, including cylinders that are tapered or irregular, cylinders that are not circular in cross section at any given point, and other possible variations.

The sections 104a-104f of the mandrel are removably joined along longitudinal seams 106, and are attachable at their fore end 108 and aft end 110 to circular mandrel support rings 112, which are mounted to a roller support frame 114. In one embodiment the mandrel support rings are of an iron-nickel alloy, which has good dimensional stability with temperature changes. However, other materials can also be used for the mandrel support rings, and they can be configured differently from the configuration shown in the drawings. The roller support frame 114 and mandrel support rings 112 allow the mandrel 102 to be axially rotated during assembly build-up of the barrel section 100. The entire assembly of the mandrel 102 and support frame 114 can be moveable so that it can be placed in an autoclave (not shown) for heat curing after initial layup of the composite barrel section 100. It is to be understood that the mandrel configuration and method of composite barrel fabrication that are shown and described herein are only one example of suitable systems and methods. Other methods and systems can also be used for fabricating a composite barrel, and the present disclosure is not limited to one particular method or system.

Once the composite barrel section 100 is fabricated and cured, the mandrel 102 can be removed from within the barrel section 100. The adjacent longitudinal segments 104 of the mandrel 102 can be detached from the mandrel support rings 112 and removed along the seams 106, and the mandrel sections 104 can be withdrawn one-by-one from against the inner surface of the barrel section 100. Those of skill in the art will appreciate that this description is general in nature, and that there can be many additional detailed operational steps and apparatus involved in this process. It will be apparent that removal of the mandrel 102 will also remove the structure that supports the barrel section 100 upon the mandrel support rings 112. Consequently, temporary supports (not shown) can be used to support the curved barrel section 100 while the mandrel 102 is being removed from within it.

Viewing FIGS. 3-6, after the mandrel 102 has been removed, or concurrently with removal of the mandrel sections, a pair of end support rings 120, 122 can be attached to the fore end 124 and aft end 126 of the barrel section 100, respectively. A barrel section 100 with one rear end ring 122 attached and another ring 102 positioned near its attachment point at the front end 124 of the barrel section 100 is provided in FIG. 3. The end rings 122, 124 can be installed immediately after mandrel removal, and help maintain the barrel shape within engineering tolerances throughout subsequent assembly and transport of the barrel section 100.

The end support rings 120, 122 are made up of a series of ring segments, indicated generally by numeral 128, that removably attach to each other. The assembled end rings define a perimeter that is congruent (i.e. same size and shape) with the respective end 124, 126 of the barrel section 100. In one embodiment, the end support ring segments include a slot 130, which defines the nominal barrel shape of the perimeter of the respective end 124, 126, within acceptable geometric tolerances. Viewing FIG. 3 in particular, the front edge 124 of the barrel section 100 fits into the slot 130, and the front end ring 120 can be attached to the barrel section with clamps (not shown). This allows the complete ring to hold the shape of the barrel section at its fore and aft ends.

Each segment 128 of the end support rings 120, 122 shown in the figures include radial spokes 132, which are each removably attached to an inner ring segment 134 and an outer ring segment 136. Elements 128, 134 and 136 are commonly labeled in both the fore end ring 120 and aft end ring 122 because of their similar shape and function, even though these structures can be of different size and shape in the respective end rings. For simplicity, the various parts of only some of the ring segments 128 are labeled in any one figure. The inner and outer ring segments 134, 136 associated with a given spoke 132 are removably attachable to the corresponding segments of the next adjacent ring segment around the circumference of the ring 120, 122, so that the entire end support ring can be assembled in place from multiple separate pieces, and dismantled in a similar way, and so that any or all of the spokes 132 and the inner ring 134 can be selectively removed, as desired. This configuration retains dimensional accuracy of the barrel during mandrel extraction and barrel storage, while providing flexibility for subsequent manufacturing processes.

Figure 3:
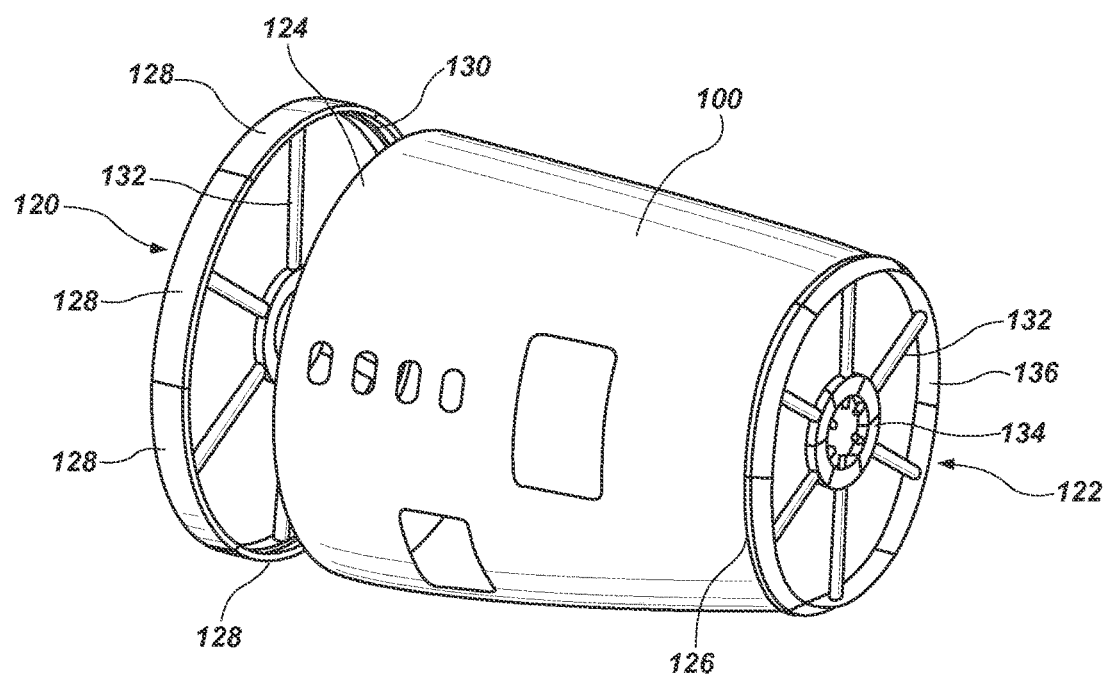
FIG. 3 is a rear perspective view of an aircraft barrel section with a rear end support ring installed, and a front end support ring positioned near the front perimeter edge of the barrel section.
Figure 4:
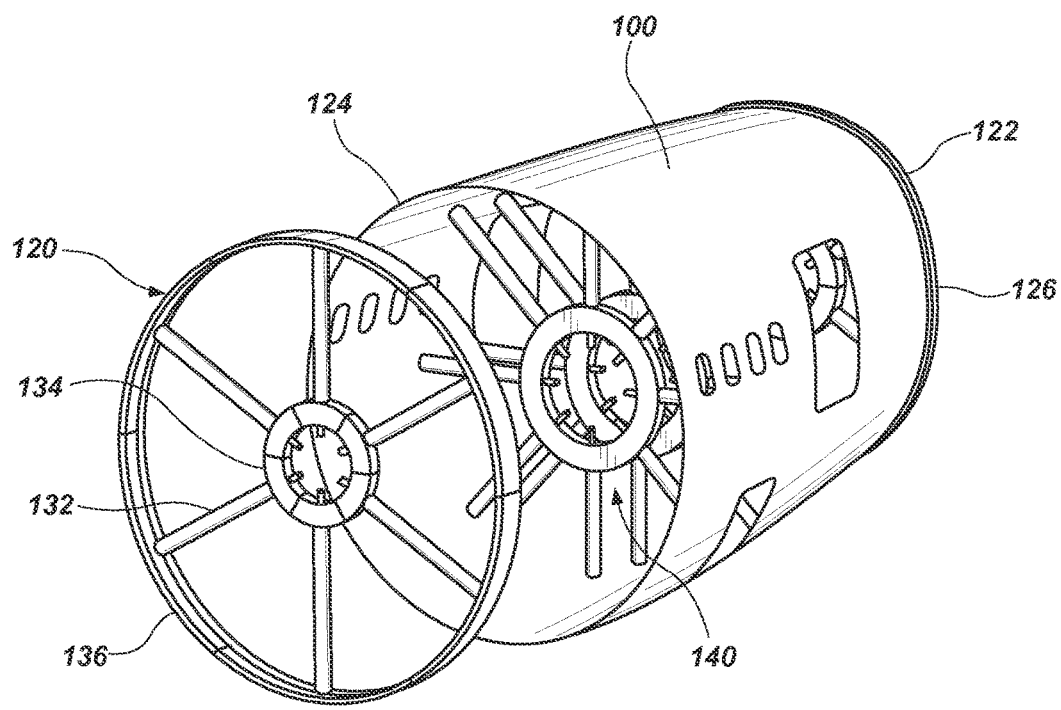
FIG. 4 is a front perspective view of an aircraft barrel section with a rear end support ring and internal support rings installed, and a front end support ring positioned near the front perimeter edge of the barrel section.
Figure 5:
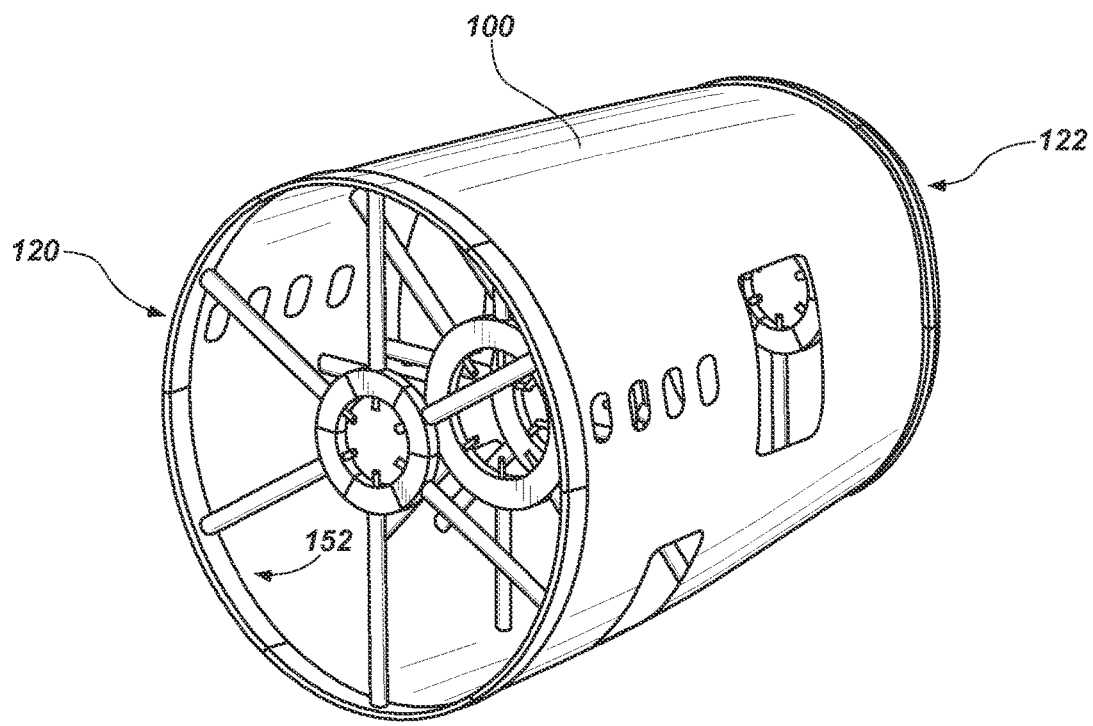
FIG. 5 is a front perspective view of an aircraft barrel section two end support rings and two internal support rings installed.

While the end support rings 120, 122 shown in FIG. 3 include six segments 128, it is to be appreciated that end support rings with a greater or lesser number of segments (e.g. five segments, eight segments, etc.) can also be used. The number of segments 128 in the end ring can match the number of mandrel segments 104. For example, a six segment end ring 120, 122 can be used where a six segment mandrel 102 is used for fabrication of the barrel section 100. It is also to be appreciated that the end support rings 120, 122 can be configured to define a circular shape as shown in the figures, or some other desired shape. For example, in the embodiment shown in FIG. 3 the aircraft fuselage barrel section 100 has a substantially circular cross-section at each of the fore and aft ends 124, 126, as is quite common. However, an end support ring 120, 122 can be configured to match a non-circular cross-section also, which can be found in aircraft and other structures that include composite barrel sections.

The end rings 120, 122 help maintain the defined barrel shape within desired tolerances during the assembly process. They also allow for an increase in process control capability. For example, without end rings that preserve the geometric shape of the barrel section, rework of the composite material may be undertaken in order to achieve the defined inner mold line surface. The end rings 120, 122 can remain in place as long as desired to help maintain the shape of the barrel section 100, which can be until the point of installation of frame components or other structure which spatially conflicts with the rings. Advantageously, the installation of frame components and other structures within the barrel section 100 will tend to stiffen and strengthen the barrel section, gradually supplanting the function of the end rings 120, 122.

Figure 6:
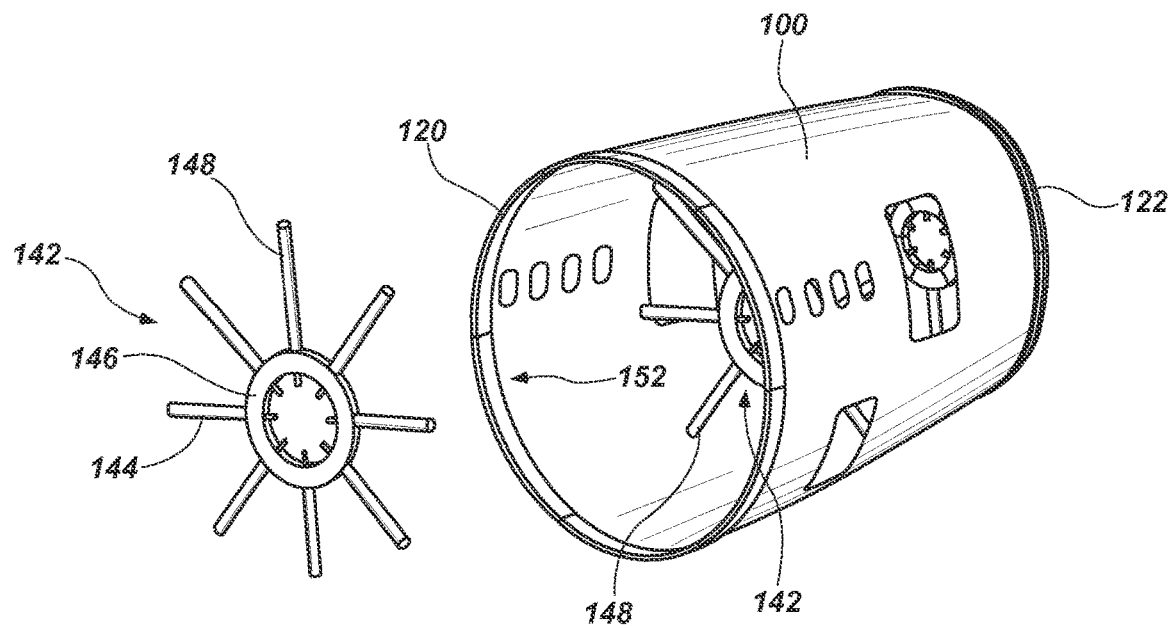
FIG. 6 is an exploded perspective view of an aircraft barrel section showing one internal support ring installed and another outside the barrel section.
Figure 10:
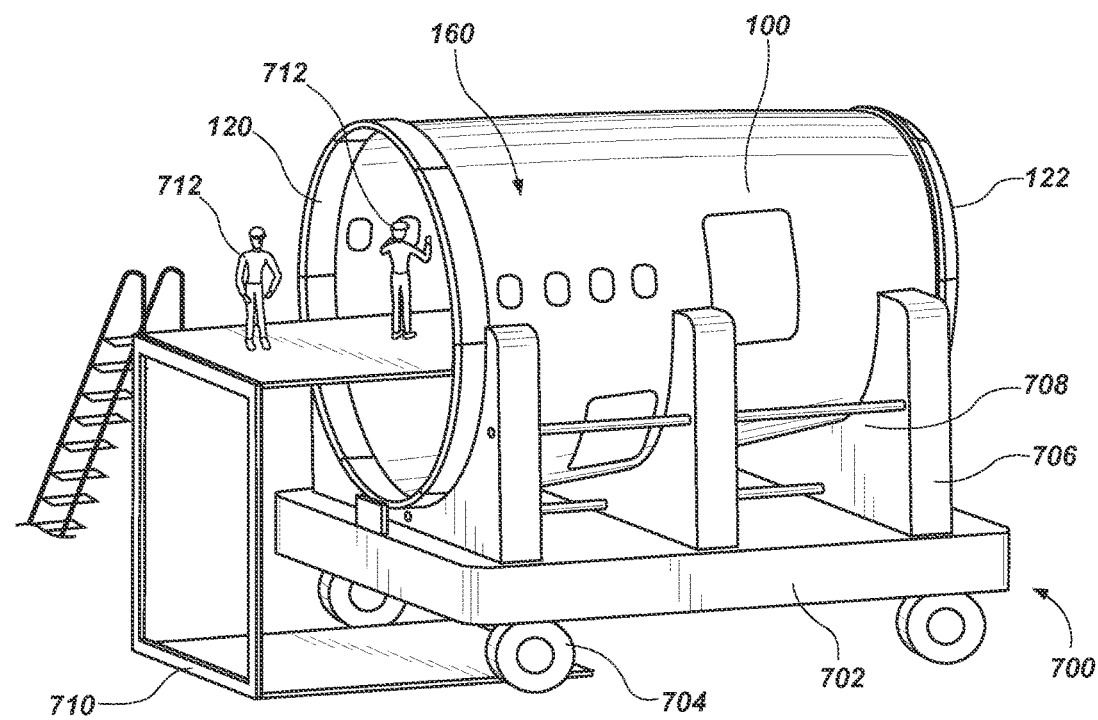
FIG. 10 is a front perspective view of an aircraft barrel section with internal and end rings, installed on a moveable transport cart.

Additionally, the entire end ring 120, 122 or individual segments of it can be removed as desired to provide accessibility, such as for assembly or other operations in a given region inside the barrel section, and later replaced if desired. For example, as shown in FIGS. 6 and 10, the spokes 132 and the inner ring 134 can be removed from the fore-end ring assembly 120, to provide access to the interior of the barrel 100. This leaves the outer ring 136 in place, which continues to provide strength and geometrical control around the perimeter of the front edge 124 of the barrel section until such time as the internal portions of the end ring 120 are reinstalled, or the barrel section 100 is attached to an adjacent barrel section, for example. Finally the end rings 120, 122 will be removed before a given barrel section 100 is attached to an adjacent barrel section at the particular end (i.e. fore or aft).

In addition to the end support rings 120, 122, the system and method disclosed herein also provides an internal or "mid" support ring assembly 140, which is shown in FIGS. 4-7. An internal support ring assembly 140 can include one or more individual spoked rings 142, each including a plurality of outwardly extending spokes 144 that are removably attachable to a central ring or hub 146. As with the end rings 120, 122, the number of spokes 144 associated with each spoked ring 142 and the spacing between spokes can vary. While internal support rings 142 are shown in the figures having eight spokes 144, a greater or lesser number of spokes can be associated with these devices. The spokes 144 can be configured to telescope in length, so that they can be adjusted to conform to barrel sections of different sizes and shapes, or to different longitudinal positions within a barrel section having a tapering size. The spokes 144 can include a bearing surface, such as a bearing pad (not shown), on their distal end 148, which directly abuts the interior surface 152 of the barrel section 100. The configuration of the bearing pad, including its size, shape, functionality and materials of construction, can be selected by one of skill in the art to facilitate barrel shape control and other desired characteristics.

Figure 7:
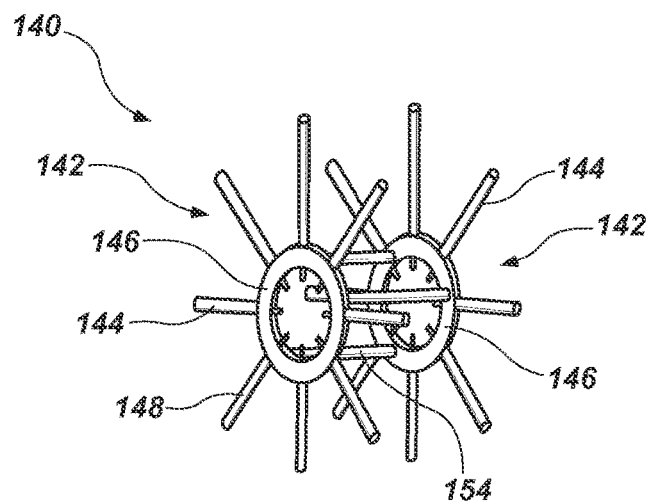
FIG. 7 is a perspective view of a pair of internal support rings connected by three longitudinal members.
Figure 9:
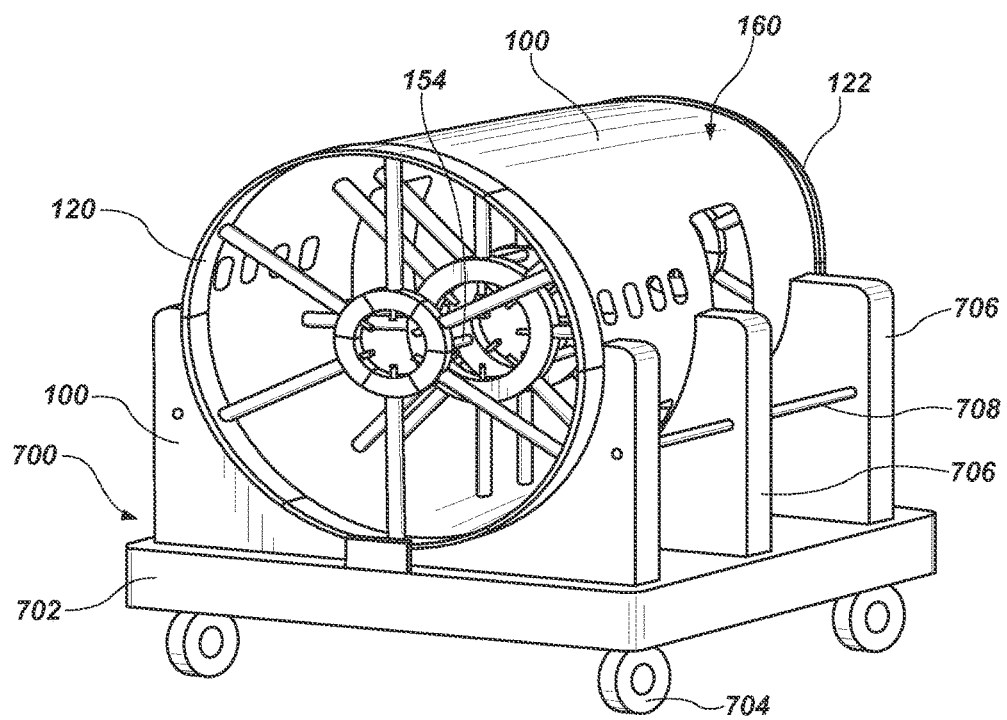
FIG. 9 is a front perspective view of an aircraft barrel section with internal and end rings installed on a moveable transport cart.

The internal support ring assembly 140 can include multiple internal support rings 142, which are attached to each other with longitudinal members 154 (e.g. rods). The longitudinal members are shown in FIGS. 7 and 9. The longitudinal members 154 can be configured to hold the central rings or hubs 146 substantially parallel to each other and at a desired distance, so that the longitudinal members 154 and the rings 146 are perpendicular to each other. This allows the longitudinal members 154 to define a horizontal datum, substantially parallel to the longitudinal axis of the barrel 100, and the spoked rings 142 and the spokes 144 to each define a vertical datum that is perpendicular to the longitudinal axis of the barrel. When the spokes 144 are attached to the central rings 146 and placed in abutting contact with the curved interior surface 152 of the barrel section 100 (which defines a third datum), a three-datum geometric control configuration is created. This helps maintain the geometric shape of the barrel section 100 better than end rings alone, and helps prevent sagging and flexure of the barrel section 100. The interior support ring assembly 140 helps to control the interior nominal shape of barrel 100.

The adjacent interior spoked rings 142, being connected to each other and adjustable between stations (i.e. fore and aft) help to maintain the nominal shape of the barrel 100 during frame installation or other operations. The spokes 144 of the interior support assembly 140 are telescopingly adjustable to a repeatable state to support the internal mold line shape within engineering tolerances. The internal support rings are also moveable within the barrel 100 from station-to-station to maintain the barrel shape as frames and other components are installed.

The order of installation of the internal support assembly 140 can vary. For example, the internal support assembly 140 can be installed before one or both of the end rings 120, 122 are attached to the ends of the barrel section 100. Alternatively, the end rings 120, 122 can be attached first, and the internal support assembly 140 can be installed afterward. For example, for an aircraft fuselage section having a variety of openings, as shown in the figures herein, the rings 146, spokes 144 and longitudinal members 154 can be inserted through an opening in the barrel section (e.g. a door opening) after the end rings are in place, and assembled inside the barrel section. It is to be understood that the sequence of installation and/or removal of various portions of the system shown herein can vary from situation to situation.

This configuration of the end rings 120, 122 and the internal spoke assemblies 140 provides barrel interface tooling that is controlled by removable structure to control the exterior shape of the barrel 100 within engineering tolerances. Advantageously, the end rings 120, 122 and spoke rings 142 are reusable barrel after barrel. Additionally, the internal spoke shape control tooling can be installed in a given barrel segment 100 immediately after curing of the barrel segment (i.e. immediately after mandrel removal) and before further product assembly begins. Workers can begin the assembly process by installing product parts upon or within the barrel sections while the spokes are in place. Later the spokes can be removed by workers without disrupting product assembly.

Figure 8:
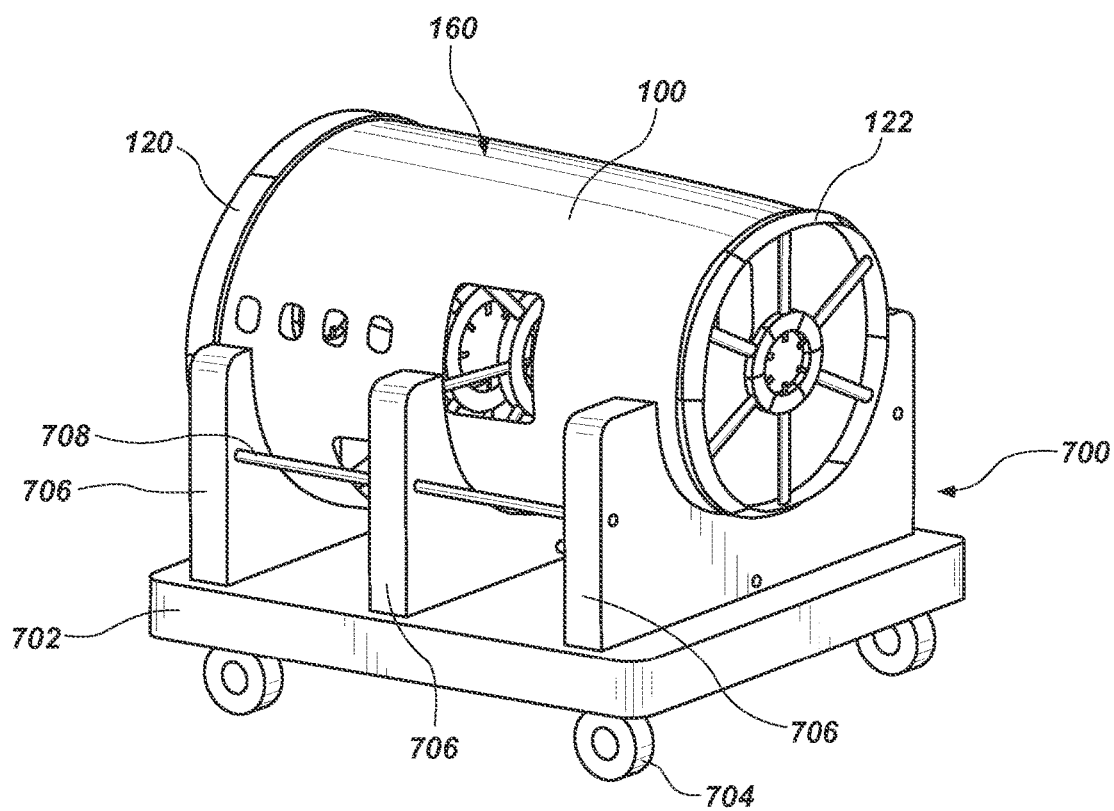
FIG. 8 is a rear perspective view of an aircraft barrel section, with internal and end rings installed, on a moveable transport cart.

With the end rings 120, 122 and internal supports 140 in place, the stabilized barrel section 100 can be transported between various assembly points and/or placed in a storage location upon a moveable datum controlled transport cart. Three views of an embodiment of a moveable transport cart 700 for a composite barrel segment 100 are shown in FIGS. 7-9. The cart 700 generally includes a frame 702 that is supported on wheels 704, with a plurality of upstanding supports 706 configured to contact and support the outer surface 160 of the barrel 100 to substantially retain its nominal shape. The upstanding supports 706 of the cart 700 can substantially conform to a shape of the outer surface of the composite barrel 100 in an unconstrained condition, which secures the barrel reference to engineering tolerances. In one embodiment, the upstanding supports 706 conform to half a circumference of the composite barrel 100 outer surface 160. Where the barrel shape includes a taper, as shown in the figures, the curvature of the interior mating surfaces of the upstanding supports can vary accordingly. The cart 700 and the barrel section 100 can also include devices, such as markings, etc., to facilitate placement of the barrel section on the cart in a desired location and orientation. A variety of such devices can be conceived by those of skill in the art.

Any number of upstanding supports 706 can be used. The upstanding supports thus provide a shape tool, holding the barrel 100 within engineering tolerances during movement from one work cell to another while maintaining the desired geometric configuration. The upstanding supports 706 can be attached to each other by longitudinal rods 708, which help ensure the position of these supports and provide additional geometric control. Viewing FIG. 10, this configuration of the cart 700 helps facilitate movement of the barrel section 100 to any desired work station 710, where workers 712 can perform any desired manufacturing or assembly operation upon the barrel section. In FIG. 10, the workstation 710 includes a platform that can be extended into the barrel section 100 to allow the workers 712 to install frame members and/or other components, or perform other operations therein. As discussed above, for this type of interior work station, the spokes 132 and central ring 134 of the end ring 120 at the fore end of the barrel 100 can be removed, leaving only the perimeter ring 136 at that end of the barrel 100. Likewise, the interior support assembly 140 can be partially or completely removed to allow insertion of the platform. It is to be appreciated that a wide variety of types of work stations can be employed in the manufacturing and assembly process, and the work station 710 shown in FIG. 10 is a simplified representation of only one type of work station.

Figure 11:
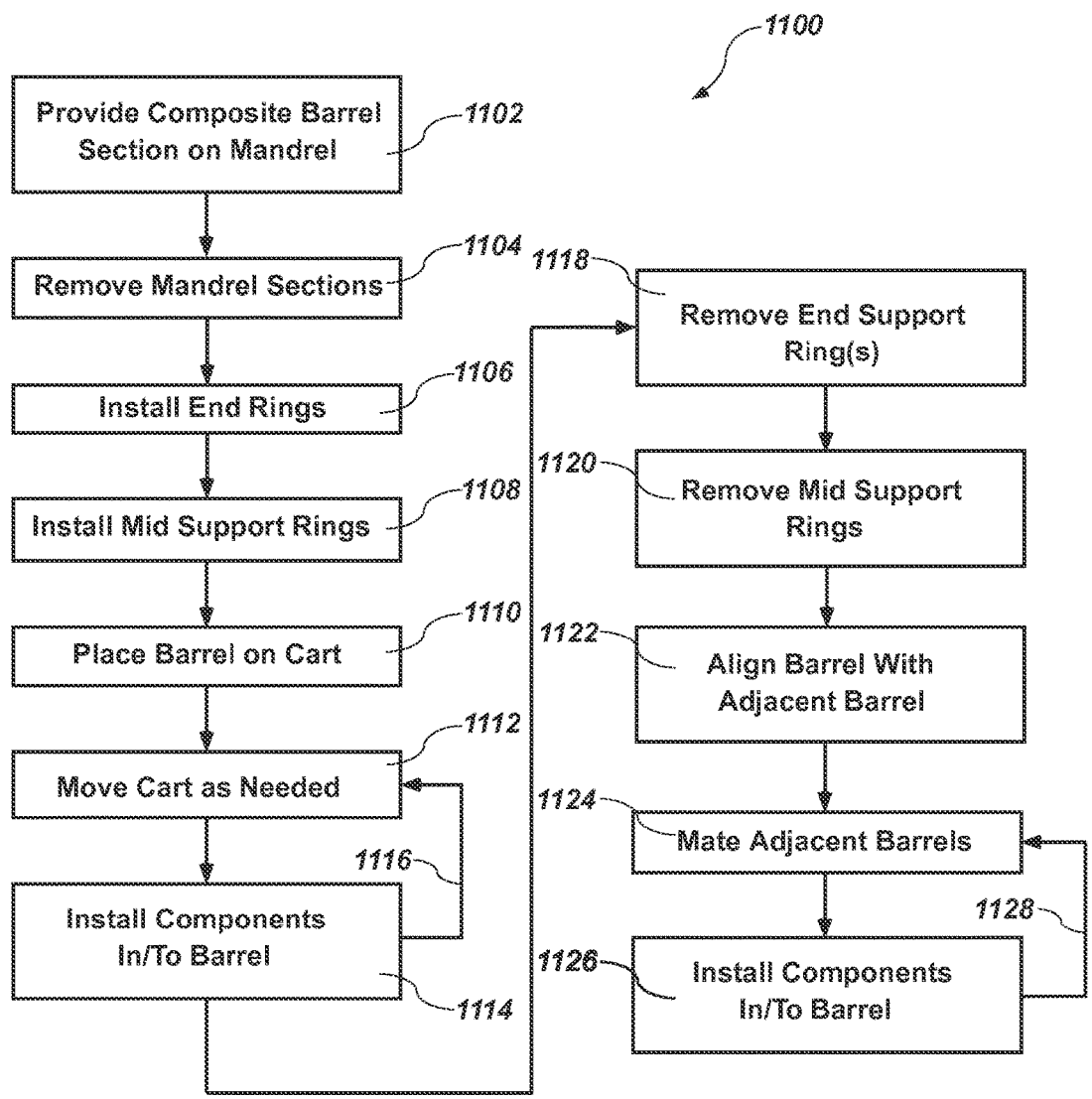
FIG. 11 is flowchart of an embodiment of a method for stabilizing a cured composite fuselage barrel according to the present disclosure.

In view of the above, one embodiment of a method 1100 for transporting a composite barrel in accordance with the present disclosure is outlined in the flowchart of FIG. 11. It is to be understood that the steps outlined in FIG. 11 can be performed in a different order than shown, and, further, while certain variations in the order of the steps are discussed herein, other variations can also be used. This embodiment of the method can be described as including the steps of providing a composite barrel section 1102 upon a mandrel, then removing the mandrel sections from against the inner surface of the composite barrel 1104. The mandrel section can be sequentially removed, and this can be done prior to or concurrently with the step of attaching first and second end rings 1106 in the barrel section. Interior or "mid" support rings are also attached 1108 against an inner surface of the composite barrel, the supports including a hub and a plurality of adjustable spokes extending from the hub to the inner surface. Attaching the mid supports can include longitudinally affixing at least two supports in substantially parallel planes that are substantially perpendicular to the inner surface of the barrel.

The composite barrel is then placed upon shape-conforming supports on a moveable platform or cart 1110, which can then be moved from place to place as needed 1112, such as between work positions that are configured for installing components in or to the barrel section 1114, or performing other manufacturing or assembly operations on the composite barrel. Moving the cart from place to place and performing additional manufacturing actions on or to it can be performed repeatedly, as indicated by the arrow 1116.

At a suitable time, typically at some point during installation of frame members and other components within the barrel section 1114, the end support rings can be removed 1118 from the barrel section in preparation for ultimate connection of the barrel section with another barrel section 1122. The mid support rings and their spokes can also be removed 1120 (perhaps only partially at first) at some point during installation of components in or to the barrel section. This will presumably be before the barrel section is attached to another barrel section, though it could conceivably occur after such attachment. Moreover, the order of removal of the mid supports and end rings can vary, and since the spokes of the mid supports are individually removable and the segments of the end rings are detachable, the end rings and mid supports can be completely or partially removed at any time, as desired. For example, one or more but not all of the spokes of a given mid support can be removed at any time during the manufacturing process as desired to facilitate various manufacturing or assembly operations within the barrel section. Additionally, some assembly processes can be performed by workers while some or all of the spokes are in place, and in certain cases spokes can be selectively removed by workers without disrupting product assembly.

When all desired preparations have been made, the composite barrel can be positioned and aligned in an opposing edge-to-edge circumferential alignment with an adjacent composite barrel 1122, to facilitate attachment or mating of the composite barrel 1124 with the adjacent composite barrel. After mating of the barrel section, additional components can be installed in or on the barrel section 1126 to continue the manufacturing and assembly process, and this can be performed repeatedly, as indicated by the arrow 1128.

Advantageously, the system and method disclosed herein helps hold a composite barrel within engineering tolerances without a floor grid installation, and allows the barrel to be moved from cell to cell and position to position. This system and method helps maintain the shape of the barrel within engineering tolerances from cell to cell and during storage. The system and method disclosed herein allows for repeatable conditions for maintaining the internal mold line shape of a composite barrel within engineering tolerances using a 3 datum control, which helps to maintain the barrel shape during the assembly process. The cart assembly combined with shape rings and internal barrel supports also helps reduce preload stresses in frames and other structures that are attached to the barrel section during assembly. It is believed that this approach can improve the quality of joints between barrels and facilitate the installation of barrel interface assemblies. It is believed that this approach has the potential to significantly reduce assembly time by reducing rework, and can also promote worker safety.

Figure 12:
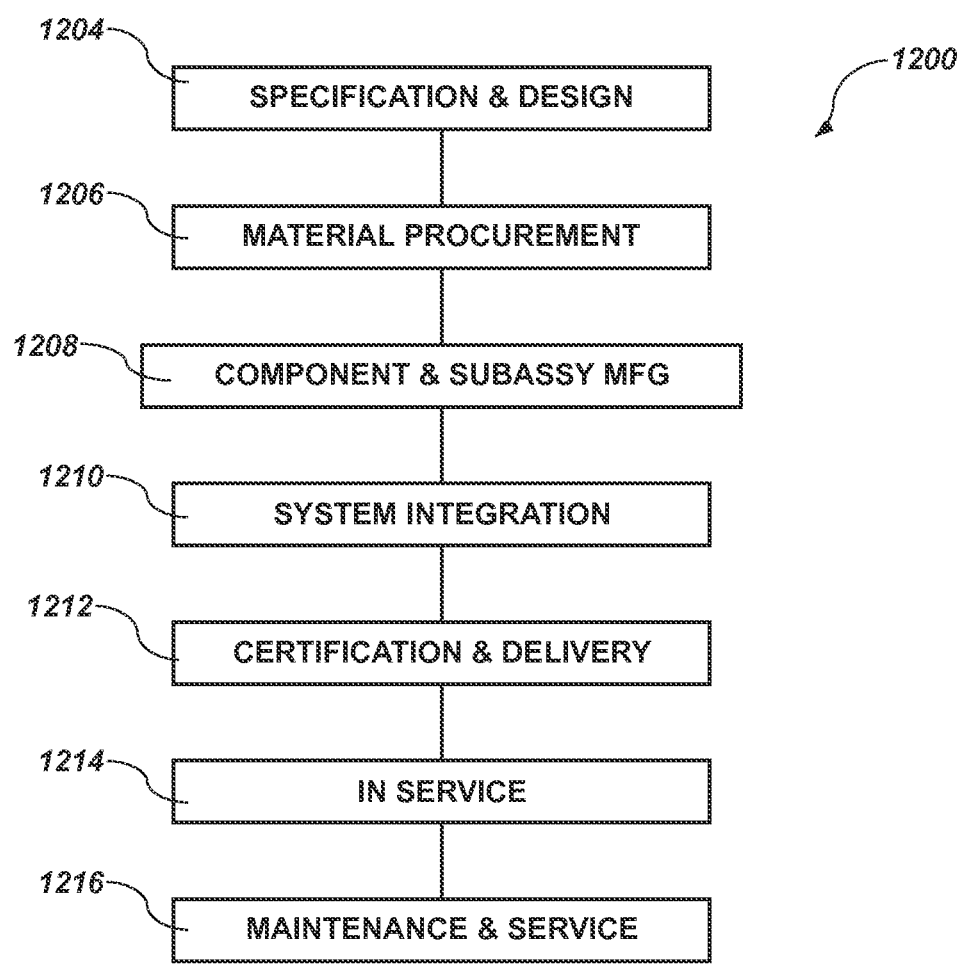
FIG. 12 is a flow diagram of aircraft production and service methodology.
Figure 13:
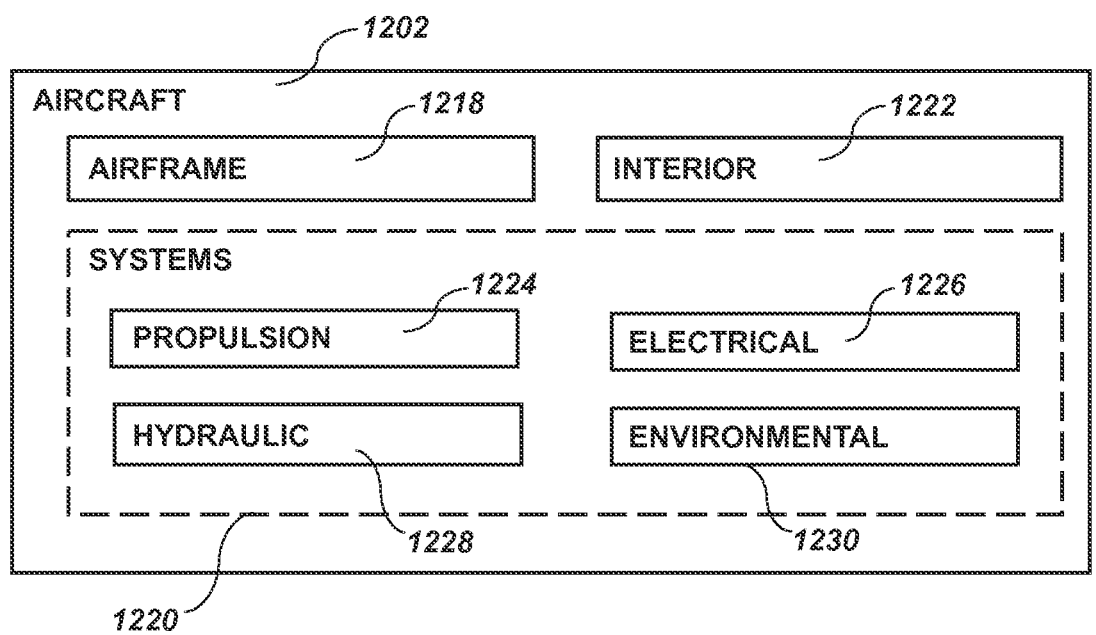
FIG. 13 is a block diagram of an aircraft.

Embodiments of the disclosure may be described in the context of an aircraft manufacturing and service method 1200 as shown in FIG. 12 and an aircraft 1202 as shown in FIG. 12. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 416 (which may also include modification, reconfiguration, refurbishment, and so on).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

Apparatus and methods embodied herein may be employed during any one or more of the stages of the production and service method 1200. For example, components or subassemblies corresponding to production process 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A tool for maintaining a shape of a composite barrel having a first end, a second end, an inner surface and an outer surface, the tool comprising:
   a first end ring, removably attachable to a first end of the composite barrel, having a perimeter that is substantially congruent with the first end, configured to maintain a shape of the barrel; and
   a mid support, removably disposable within the composite barrel, having a plurality of spokes extending outwardly from a central hub to contact the inner surface, to maintain a shape of the barrel.

2. The tool of claim 1, wherein the mid support comprises at least two supports having a plurality of spokes extending outwardly from a central hub, the spokes being longitudinally affixed in substantially parallel planes, and the at least two supports being disposed substantially perpendicularly with respect to the inner surface of the composite barrel.

3. The tool of claim 2, further comprising a longitudinal member, connected between the central hubs, defining a horizontal datum that is substantially parallel to a longitudinal axis of the barrel, and substantially perpendicular to the planes of the at least two supports.

4. The tool of claim 1, wherein at least some of the plurality of spokes are removable from the hub and are adjustable in length.

5. The tool of claim 1, wherein the mid support comprises six spokes extending outwardly from the central hub, each of the six spokes being configured to contact the inner surface in a region generally corresponding to a position of a segment of a six-segment mandrel upon which the composite barrel was fabricated.

6. The tool of claim 1, further comprising a second end ring, removably attachable to the second end of the composite barrel, having a perimeter that is substantially congruent with the second end, configured to maintain a shape of the composite barrel.

7. The tool of claim 1, wherein the first end ring comprises a plurality of releasably attachable arcuate segments, each arcuate segment comprising an outer ring segment, an inner ring segment, and a spoke interconnecting the outer ring segment and the inner ring segment.

8. The tool of claim 1, further comprising a moveable cart, having a plurality of supports configured to contact and support the outer surface to substantially retain a nominal shape thereof.

9. The tool of claim 1, the first end ring further comprising a slot configured to receive a front edge of the first end of the composite barrel.

10. The tool of claim 1, wherein the plurality of spokes extending outwardly from the central hub are configured to telescope in length.

11. The tool of claim 1, wherein each of the plurality of spokes extending outwardly from the central hub further comprises a bearing surface on a distal end of the spoke.

12. The tool of claim 7, the plurality of outer ring segments further comprising a slot configured to receive a front edge of the first end of the composite barrel.

13. The tool of claim 12, wherein with the front edge of the first end of the composite barrel received in the slot of the outer ring segments each inner ring segment and spoke may be selectively removed while the plurality of outer ring segments remain attached to the first end of the composite barrel via the slot.

14. The tool of claim 13, wherein a platform may be extended into the barrel section with the inner ring segments and spokes removed.

15. The tool of claim 8, wherein the plurality of supports of the movable cart conform to half a circumference of the composite barrel.

16. The tool of claim 8, the cart further comprising a plurality of wheels connected to a bottom surface of a frame, wherein the plurality of supports of the movable cart further comprise a plurality of upstanding supports connected the top surface of the frame.

17. The tool of claim 16, wherein the plurality of upstanding supports are attached to each other by a plurality of longitudinal rods.

18. The tool of claim 8, wherein the shape of the barrel includes a taper.

19. The tool of claim 18, wherein the plurality of supports of the movable cart conform to half a circumference of the composite barrel.

* * * * *